Figure 1:
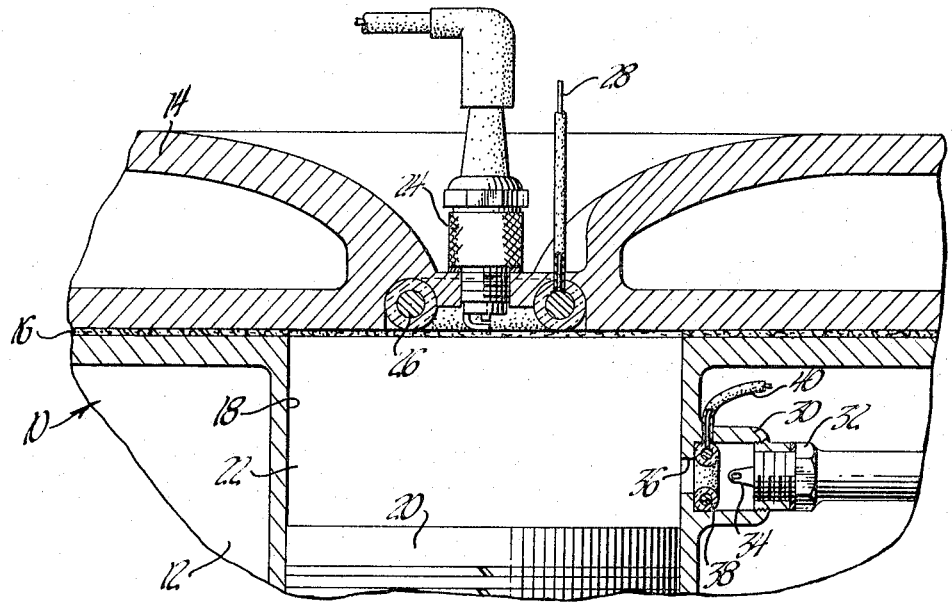

INVENTORS
Robert Hickling, &
BY John C. Kent

J. L. Carpenter
ATTORNEY

United States Patent Office 3,318,293
Patented May 9, 1967

3,318,293
INTERNAL COMBUSTION ENGINE FUEL CHARGE STRATIFICATION BY ELECTROSTATIC FORCES
Robert Hickling, Warren, and John C. Kent, Birmingham, Mich., assignors to General Motors Corporation, Detroit, Mich., a corporation of Delaware
Filed May 14, 1965, Ser. No. 455,718
11 Claims. (Cl. 123—32)

This invention relates to engine fuel charges and, more particularly, to a method and means for using electrostatic forces to stratify, or locally enrich, the fuel charges in internal combustion engines.

It is recognized that the operation of an internal combustion engine at part load would be improved if it were possible to concentrate an enriched portion of the charge around the spark plug. Once this small portion of charge is ignited, its energy would be sufficient to ignite the remainder of the charge which may have a much lower fuel-to-air ratio. In this way lean overall mixtures, which are outside the so-called limits of flammability, could be used to operate the engine. Such a process would result in reductions in fuel consumption at part load and in the amount of hydrocarbons in the exhaust.

Previous attempts have been made to apply the principles of charge stratification to an operating engine. The methods used have generally fallen into two catagories, in the first of which the combustion chamber is separated into two sections, one containing the enriched portion of the charge and the other containing the leaner portion. The sections are connected by some kind of passageway so that when the enriched portion of the charge is ignited by the spark the resulting combustion spreads through the passageway to the leaner mixture in the main chamber. In the second category a unitary combustion chamber is used and the flow characteristics of the incoming air and fuel droplets are arranged in such a way that an enriched portion of the charge is adjacent the spark plug at the time of ignition.

Tests made on experimental engines have shown that the desirable features of charge stratification, or localized enrichment, can be achieved, but these engines have not yet been developed to the stage where they can supersede engines currently in use. This is due in part to the shortcomings of the above described types of charge stratification, the first of which suffers reduced thermal efficiency due to increased surface-to-volume ratio of the combustion chamber and the second of which results in reduced volumetric efficiency due to channeling and directing of the inlet flow. In addition, neither of these types is susceptible to much adjustment or control during engine operation.

The purpose of the present invention is to provide a method and means for creating localized enrichment of the fuel charge in an operating engine utilizing electric charges and forces acting within the combustion chamber. With this arrangement, fuel droplets are electrically charged as they are delivered to the combustion chamber and the charged droplets are attracted toward an oppositely charged electrode located near the spark plug, thus forming an enriched portion of air-fuel mixture in the region of the spark plug. This arrangement is applicable to many of the presently used efficient combustion chamber shapes so that no loss in engine efficiency will occur from its use. In addition, control of the degree of local enrichment is obtainable by varying the strength of the electric field in the combustion chamber and the strengths of the electric charges created on the fuel droplets.

Figure 2:
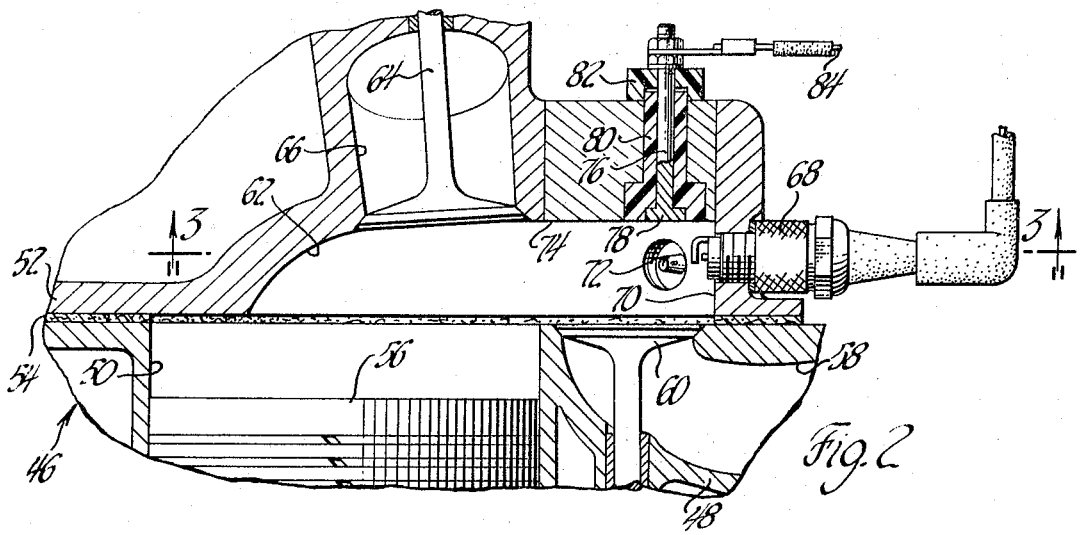
Figure 3:
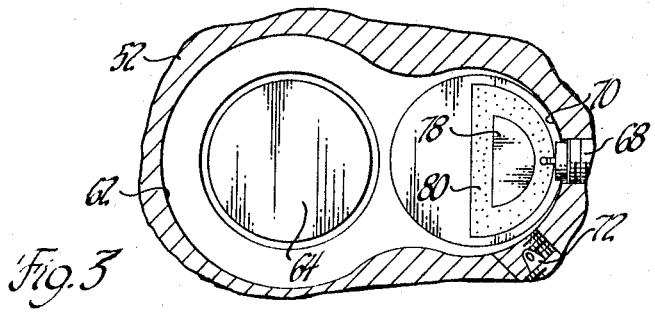

Further advantages of the arrangement proposed herein will be apparent from the specific embodiments disclosed in the following specification and drawings in which:

FIGURE 1 is a fragmentary cross-sectional view of an engine embodying one form of the invention;
FIGURE 2 is a fragmentary cross-sectional view of an engine having an F-head valve arrangement and embodying a second form of the invention; and
FIGURE 3 is a fragmentary cross-sectional view of the engine of FIGURE 2 taken generally along the plane indicated by the line 3—3.

Referring now to the drawings, FIGURE 1 illustrates an internal combustion engine generally indicated by numeral 10. The engine includes a combustion chamber housing comprising an engine cylinder block 12 and a cylinder head 14 secured together and sealed by the usual combustion gasset 16. The cylinder block 12 includes a cylinder 18 in which a piston 20 is disposed for reciprocating movement. The walls of cylinder 18, the face of cylinder head 14 and the crown of piston 20 together define a combustion chamber 22.

A spark plug 24 in the face of the cylinder head and centrally located above the combustion chamber is surrounded by an insulated ring electrode 26 which is connectible to an external voltage source by means of a lead wire 28.

On one side of cylinder 18, mounting means 30 are provided which carry a fuel injector 32 having an orificed tip portion 34. The injector is adapted to spray atomized droplets of liquid fuel through an opening 36 in the cylinder wall and into the combustion chamber 22. A small insulated ring electrode 38 is placed between injector tip 34 and opening 36 and is connectible to an external voltage source through a lead wire 40.

The operation of the embodiment described above is as follows. At a suitable time in the engine cycle, preferably after closing of the valves (not shown) and during the piston compression stroke, a charge of fuel is sprayed into the engine cylinder by injector 32. While the fuel is being sprayed, ring electrode 38 is electrically charged to a potential different from that of the injector. This creates a strong electric field which causes the fuel droplets to be charged by induction to a potential of opposite polarity to that of the ring electrode 38. Thus, if the ring electrode is charged positively with respect to the injector, the fuel droplets will acquire a negative electric charge.

During the compression stroke of the piston, or any desired part thereof, an electric charge is also placed on ring electrode 26. This charge is made opposite in polarity to that of the charged fuel droplets and thus creates an electric field in the combustion chamber which attracts the charged droplets toward electrode 36. A stratification of the fuel charge is thus caused which involves enrichment of the fuel-air mixture in the vicinity of spark plug 24. The enriched mixture is ignited by the spark plug at a desired point in the engine cycle, resulting in burning of the fuel charge in the cylinder.

In order to reduce power losses, charging of the ring electrodes may be limited to the portions of the cycle in which they perform a useful function. Thus, ring electrode 38 need be charged only during the fuel injection portion of each cycle and ring electrode 26 need be charged only during the period from injection of the fuel to ignition thereof. Control of the stratification process may be accomplished by varying the strengths of the charges on either or both ring electrodes 26 and 38 as well as by varying the lengths of time during the periods mentioned in which the electrodes are charged.

FIGURES 2 and 3 illustrate a slightly different embodiment of the present invention which is shown in conjunction with an engine having an F-head valve arrangement. The engine is generally indicated by numeral 46 and includes a cylinder block 48 having a cylinder 50, the upper end of which is closed by a cylinder head 52 secured to the block and sealed by gasket 54. A piston 56 is disposed for reciprocating movement in cylinder 50. Adjacent to the cylinder, the cylinder block also includes an exhaust passage 58 which opens through the upper surface of the block and is closed by an exhaust valve 60.

Within cylinder head 52, a combustion chamber 62 is formed which overlies the end of exhaust passage 58 and a portion of cylinder 50. An inlet valve 64 is carried by the head and closes the end of inlet passage 66 which opens into the top of the combustion chamber.

At the end of the combustion chamber adjacent the exhaust valve, a spark plug 68 is carried in a vertical side wall portion 70 of the cylinder head combustion chamber while a fuel injector 72 is mounted in the same side wall but disposed at an angle to the spark plug, the spark plug and the injector having axes which approximately intersect the axis of valve 60. At the same end of the combustion chamber and in an upper wall 74 thereof is carried an electrode 76, having a plate-like surface 78 facing into the combustion chamber near the location of spark plug 68 and relatively close also to fuel injector 72. The electrode is insulated from the cylinder head in which it is carried by suitable insulating means 80 and 82 and is connectible with an external voltage source through lead wire 84 which is connected to the electrode.

The operation of the embodiment of FIGURES 2 and 3 is similar to that of FIGURE 1 except that only the single electrode 76 is utilized. This electrode is sufficiently close to injector 72 that the electric field generated by energizing the electrode induces an electric charge of opposite polarity on fuel droplets sprayed into the combustion chamber by the injector. The oppositely charged fuel droplets are then attracted toward surface 78 of the electrode and, thus, enrichment of the fuel mixture adjacent the spark plug is accomplished. As in the embodiment of FIGURE 1, the degree of enrichment can be controlled by regulating the potential with which electrode 76 is charged, as well as by controlling the length of the charging period.

The practical problems involved in applying the invention to an actual engine include many variables such as the distance fuel droplets must be moved in the combustion chamber to create the stratification desired, the length of time in each cycle allowed for such movement, the range of sizes of fuel droplets involved, the rate of evaporation of the droplets in the combustion chamber and the limit of electric potential which can be applied to the electrodes without reaching the breakdown strength of the gases in the combustion chamber. Analysis of the requirements of this system in an automotive engine indicate that, in an engine operating at 3000 r.p.m., the movement of a droplet a distance of 1 cm. during the $\frac{1}{10}$ of a cycle would require the droplet to reach an average velocity of 500 cm. per second. Assuming an average size droplet of .001 cm., droplets can be charged to a sufficient potential to overcome the viscous drag of the combustion chamber gases and reach the desired velocity with an electric field strength of about 5 kv./cm. which is well within the expected breakdown strength of the gases of 30 kv./cm. It has also been calculated that the rate of evaporation of the average size fuel droplet is such that it would remain in existence for approximately .002 second, which is the same as the above mentioned time necessary to move the droplet 1 cm. in the combustion chamber under the conditions given. It is therefore concluded that the present invention offers a practical solution to the problem of charge stratification in many spark ignition engines of the type commonly in use today.

The method and means disclosed are superior to those previously conceived in that efficient combustion chamber configurations may be utilized and the system is completely controllable during operation. The strength of charge may be varied to give the most desirable fuel-air ratio at the spark plug during all conditions of operation. Also, control means could be incorporated to automatically stop operation of the stratification system during full throttle operation of the engine and reinstate such operation during part load operation. An engine provided with this system may then be expected to exhibit performance and efficiency equal to standard engines during full throttle operation and superior thereto at part load operation as well as being able to operate at overall fuel-air ratios which would be below the limit of flammability without charge stratification.

While the problem of forming charged fuel droplets in the present invention suggests the use of fuel injectors spraying directly into the engine combustion chambers, the invention is not limited to such a construction but could be equally well applied to produce charge stratification in engines where fuel is delivered to the combustion chambers by other means. In the case of carbureted engines, for instance, it would be possible to electrostatically charge fuel droplets in the induction passage by conducting the droplets through a unipolar corona discharge as well as by other known means.

From the description heretofore given, other embodiments and variations of the present invention will be apparent to those skilled in the art, and the invention is therefore not to be limited except as defined by the following claims.

What is claimed is:

1. In an internal combustion engine having a combustion chamber,
    means to supply fuel droplets to said combustion chamber, and
    means to electrically charge the fuel droplets supplied to said chamber and to provide an electric field in said chamber to act upon said charged fuel droplets and thereby concentrate said droplets in a predetermined portion of said chamber.

2. In an internal combustion engine having a combustion chamber,
    means to supply fuel droplets to said combustion chamber,
    first means to electrically charge the fuel droplets supplied to said chamber and
    second means to provide an electric field in said chamber to act upon said charged fuel droplets and thereby concentrate said droplets in a predetermined portion of said chamber.

3. In an internal combustion engine having a combustion chamber,
    fuel supply means through a wall of said chamber to supply fuel droplets thereto,
    igniting means in said chamber to ignite the fuel supplied thereto and electric means to electrically charge the fuel droplets supplied to said chamber and to provide an electric field in said chamber to act upon said charged fuel droplets and thereby concentrate said droplets adjacent said igniting means.

4. In an internal combustion engine having a combustion chamber,
    fuel supply means through a wall of said chamber to supply fuel droplets thereto,
    first electric means to electrically charge the fuel droplets supplied to said chamber,
    igniting means in said chamber to ignite the fuel supplied thereto and
    second electric means to provide an electric field in said chamber to act upon said charged fuel droplets and thereby concentrate said droplets adjacent said igniting means.

5. In an internal combustion engine having a combustion chamber, fuel injection means through a wall of said chamber to supply fuel droplets thereto,
    spark ignition means in said combustion chamber to ignite the fuel supplied thereto and electrode means in a wall of said chamber and being adapted to be charged to a predetermined potential with respect to said fuel supply means to electrically charge the fuel droplets supplied to said chamber and to act upon said droplets so as to enrich the fuel charge adjacent said ignition means.

6. The combination of claim 5 wherein said electrode means is located near both said spark ignition means and said fuel injection means.

7. In an internal combustion engine having a combustion chamber,
fuel injection means to supply fuel droplets to said chamber,
means including a first electrode near said fuel injection means and adapted to be charged to a predetermined potential with respect thereto to electrically charge the fuel droplets supplied to said chamber,
spark ignition means in said chamber to ignite the fuel supplied thereto and
means including a second electrode near said spark ignition means and adapted to be charged to a predetermined potential of opposite polarity to the charge on said fuel droplets to attract said droplets and thereby create an enriched fuel charge adjacent said spark ignition means.

8. The combination of claim 7 wherein said first electrode comprises an insulated ring surrounding the path of fuel flow into said chamber and said second electrode comprises an insulated ring in a wall of said chamber and surrounding said spark ignition means.

9. A method for forming a locally enriched fuel charge in the combustion chamber of an internal combustion engine, said method comprising the steps of
introducing electrically charged fuel droplets into said combustion chamber and
applying to said combustion chamber an electric field having a force and direction with respect to said charged droplets such that said droplets are concentrated in a predetermined portion of said chamber.

10. A method for forming a locally enriched fuel charge in the combustion chamber of an internal combustion engine, said method comprising
electrically charging fuel droplets
introducing said charged fuel droplets into the combustion chamber and
applying to said combustion chamber an electric field having a force and direction with respect to said charged droplets such that said droplets are concentrated in a predetermined portion of said chamber.

11. A method for forming a locally enriched fuel charge in the combustion chamber of an internal combustion engine, said method comprising the steps of
atomizing a charge of liquid fuel to form a plurality of fuel droplets,
electrically charging said fuel droplets,
introducing said charged fuel droplets into the combustion chamber and
applying to said combustion chamber an electric field having a force and direction with respect to said charged droplets such that said charged droplets are concentrated in a predetermined portion of said chamber.

References Cited by the Examiner
UNITED STATES PATENTS

| | | |
|---|---|---|
| 1,687,550 | 10/1928 | Ehret. |
| 2,766,582 | 10/1956 | Smith. |
| 2,844,135 | 7/1958 | Thayer _____ 123—119 |
| 2,855,140 | 10/1958 | Sedlacsik. |
| 3,171,396 | 3/1965 | Vidal _____ 123—191 X |

FOREIGN PATENTS 207,196   3/1957   Australia.

MARK NEWMAN, Primary Examiner.
A. L. SMITH, Assistant Examiner.